United States Patent
Walls

(10) Patent No.: US 8,743,964 B2
(45) Date of Patent: Jun. 3, 2014

(54) SYSTEM AND METHOD FOR BLOCK-BASED PER-PIXEL CORRECTION FOR FILM-BASED SOURCES

(75) Inventor: Federick George Walls, Phoenixville, PA (US)

(73) Assignee: Broadcom Corporation, Irvine, CA (US)

( * ) Notice: Subject to any disclaimer, the term of this patent is extended or adjusted under 35 U.S.C. 154(b) by 1564 days.

(21) Appl. No.: 12/105,664

(22) Filed: Apr. 18, 2008

(65) Prior Publication Data

US 2009/0067508 A1 Mar. 12, 2009

Related U.S. Application Data

(60) Provisional application No. 60/971,662, filed on Sep. 12, 2007.

(51) Int. Cl.
| | |
|---|---|
| H04N 7/12 | (2006.01) |
| H04N 11/02 | (2006.01) |
| H04N 11/04 | (2006.01) |
| H04N 7/26 | (2006.01) |
| H04N 7/32 | (2006.01) |
| H04N 7/36 | (2006.01) |
| H04N 7/50 | (2006.01) |

(52) U.S. Cl.
CPC ... *H04N 19/00278* (2013.01); *H04N 19/00254* (2013.01); *H04N 19/00478* (2013.01); *H04N 19/00569* (2013.01); *H04N 19/00945* (2013.01); *H04N 19/00587* (2013.01); *H04N 7/50* (2013.01); *H04N 7/26244* (2013.01); *H04N 7/26015* (2013.01)
USPC ............ 375/240.24; 375/240.01; 375/240.16; 375/240.26

(58) Field of Classification Search
CPC . H04N 7/50; H04N 7/26244; H04N 7/26015; H04N 19/00254; H04N 19/00278; H04N 19/00478; H04N 19/00569; H04N 19/00945; H04N 19/00587
USPC .............. 375/240.01, 240.16, 240.24, 240.26
See application file for complete search history.

(56) References Cited

U.S. PATENT DOCUMENTS

| | | | | | |
|---|---|---|---|---|---|
| 5,650,860 | A | * | 7/1997 | Uz ................................ | 382/253 |
| 5,761,398 | A | * | 6/1998 | Legall ......................... | 358/1.15 |
| 5,821,991 | A | * | 10/1998 | Kwok ............................ | 348/96 |
| 5,844,618 | A | * | 12/1998 | Horiike et al. ................. | 348/441 |

\* cited by examiner

*Primary Examiner* — Geepy Pe
(74) *Attorney, Agent, or Firm* — Duane S. Kobayashi

(57) ABSTRACT

A system and method for block-based per-pixel correction for film-based sources. The appearance of mixed film/video can be improved through an adaptive selection of normal deinterlaced video relative to inverse telecine video. This adaptive selection process is based on pixel difference measures of sub-blocks within defined blocks of pixels.

19 Claims, 4 Drawing Sheets

SYSTEM AND METHOD FOR BLOCK-BASED PER-PIXEL CORRECTION FOR FILM-BASED SOURCES

This application claims priority to provisional application No. 60/971,662, filed Sep. 12, 2007, which is incorporated by reference herein, in its entirety, for all purposes.

BACKGROUND

1. Field of the Invention

The present invention relates generally to television signal decoding and, more particularly, to a system and method for block-based per-pixel correction for film-based sources.

2. Introduction

Modern high-resolution and high-definition televisions require a method for displaying lower-resolution field-based content (e.g., SDTV, 1080i) in a high quality way. Some types of field-based content can be created through the conversion of a progressive source (such as film) using a process commonly referred to as telecine.

To illustrate the telecine process, consider for example the process of converting 24 frame/s film to 59.94 Hz NTSC video. NTSC is made up of fields, which are made up of every other horizontal scanline. One field contains all the odd numbered scanlines, while the next field contains all the even numbered scanlines. A frame is then the combination of two consecutive fields viewed at the same time. This process is called interlacing.

The conversion of 24 frame/s file to 29.97 frame/s NTSC interlaced video is known as 3:2 pulldown. In this conversion, there are approximately four frames of film for every five frames of NTSC video. These four frames are "stretched" into five by exploiting the interlaced nature of NTSC video. To illustrate this relation, consider the 3:2 pulldown of FIG. 1.

As illustrated, for every NTSC frame, there are actually two fields, one for the odd-numbered lines of the image, designated as the top field (TF), and one for the even-numbered lines, designated as the bottom field (BF). There are, therefore, ten NTSC fields for every four film frames. To accommodate this "stretching," the telecine process alternately places the first film frame across two fields, the second frame across three fields, the third frame across two fields, and the fourth frame across three fields. The cycle repeats itself completely after four film frames have been converted. As illustrated, the TF of the second film frame and the BF of the fourth film frame are duplicate copies.

The particular pulldown method that is applied is based on the type of film and the type of display format (e.g., NTSC, PAL, etc.). As such, various other pulldown methods such as 2:2, 5:5, 6:4, 8:7, etc. can be used for a given application To display field-based content that is generated by a particular telecine process on a modern television display, it is therefore necessary to recover the original progressive source content such as film. This source can be reconstructed from the field-based content using an inverse telecine process. In this inverse telecine process, it is critical that the correct cadence (e.g., 2:2, 3:2, 5:5, 6:4, 8:7, etc.) of the field-based content be identified so that the correct fields can be weaved together to produce the original progressive source.

Unfortunately, many films that have undergone telecine have been subsequently edited using video equipment that ignores the original film cadence. The result is "mixed" content where normal video is overlaid on top of film that has undergone a telecine process (e.g., 3:2). If inverse telecine is performed on such video, the video-mode parts appear to be "weaved" as well, which is visually unappealing.

One solution to this problem is to turn off telecine for certain portions of the screen and use a normal video-mode deinterlacer for those cases. What is needed therefore is an efficient mechanism for detecting the regions that contain video-mode content and appropriately switching to video mode for those regions.

SUMMARY

A system and/or method for block-based per-pixel correction for film-based sources, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

When normal video is overlaid on top of film that has undergone a telecine process (e.g., 3:2), objectionable artifacts can occur when an inverse telecine process is performed. For example, titles (or tickers) that move or fade may be laid over film material. When this mixed content is passed to an intelligent MPEG encoder, the encoder can sometimes pick up the strong 3:2 cadence of the underlying film material, resulting in a poor display of the moving text.

In accordance with the present invention, an adaptive block-based per-pixel mechanism is provided that can turn off the inverse telecine process for certain portions of the screen and use a normal video-mode deinterlacer instead. In this manner, the normal video-mode content would not undergo the inverse telecine process, which can produce objectionable display of the video-mode content.

One of the difficulties of per-pixel correction is the determination of which regions contain video-mode content. In the present invention, it is recognized that the differences between the repeat fields can be used to determine the areas on the screen that are suspected to contain video-mode content.

Figure 1:
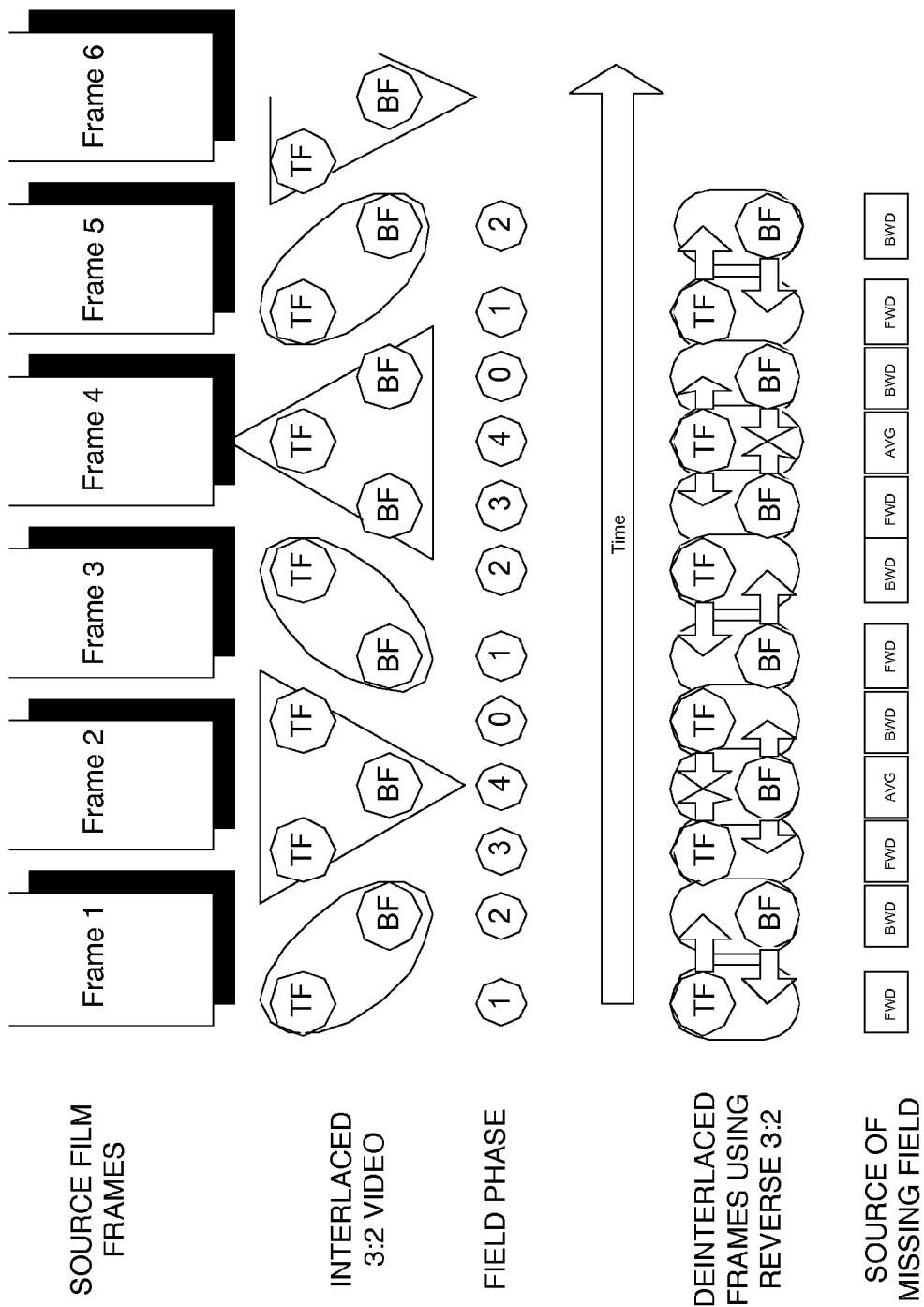
FIG. 1 illustrates an example of a telecine process.

In the example of a 3:2 cadence, such as that illustrated in FIG. 1, the repeat field occurs when the same field is utilized twice. This happens during the "3" part of the 3:2 cadence. In the example of FIG. 1, the repeat fields occur in the top fields (TFs) of Frame 2 and the bottom fields (BFs) of Frame 4.

Figure 2:
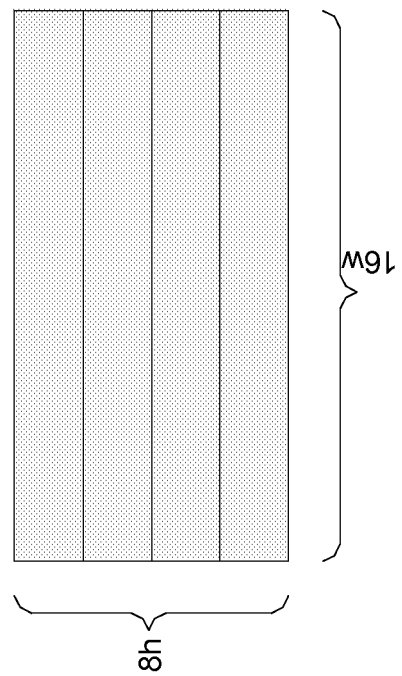
FIG. 2 illustrates an example of sub-blocks within a block of pixels.
Figure 2:
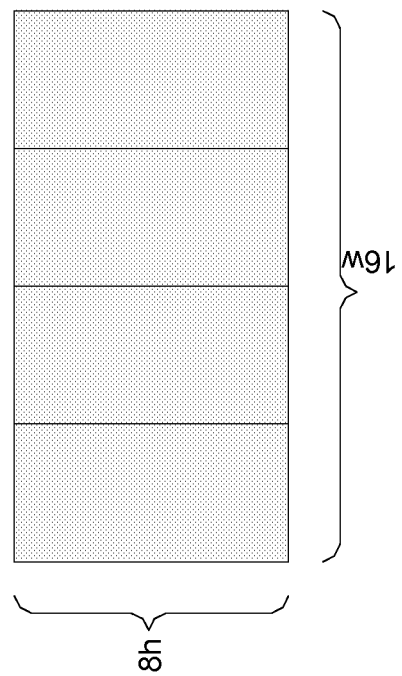

In the present invention, the detection of those regions that are suspected to contain video mode content is enabled by dividing the source field into blocks of pixels. In one embodiment, the source field is divided into 16×8 blocks. Each block is further subdivided into four 8×4 sub-blocks and four 16×2 sub-blocks. FIG. 2 illustrates the vertically-oriented and horizontally-oriented sub-blocks within 16×8 blocks. The advantage of using horizontal and vertical rectangular sub-blocks is to provide sensitivity to video moving in both the horizontal and vertical directions. The vertical rectangle is wider because it provides better immunity to comb filter artifacts.

For each of these sub-blocks a repeat field difference (RFD) function can be defined. In one embodiment, the RFD function is the signed luma difference between the two repeat fields. In an alternative embodiment, the RFD function can be based on luma and chroma components.

In a luma-only implementation, the function RFD(x,y) can be defined as the signed luma difference between the two repeat fields, or Y1(x, y)−Y2(x, y), where Y1 and Y2 are the luma values for the source frame. The signed RFD(x, y) is then summed over each sub-block, taking the absolute value of the result. If the upper left corner of each 16×8 block is (bx, by) then the following difference function for the sub-block can be defined as:

$$sbdiff1(sbx, sby) = \left| \sum_{i=sby}^{sby+7} \sum_{j=sbx}^{sbx+3} RFD(j, i) \right|$$

where (sbx, sby) corresponds to the x and y coordinates of each sub-block, or more formally:

sbx=bx, bx+4, bx+8, bx+12
sby=by

As noted, each 16×8 block is also divided into four 16×2 blocks. Again, the signed RFD(x, y) is summed over each sub-block, taking the absolute value of the result. More formally, $$sbdiff2(sbx, sby) = \left| \sum_{i=sby}^{sby+1} \sum_{j=sbx}^{sbx+15} RFD(j, i) \right|$$

where (sbx, shy) corresponds to the x and y coordinates of each sub-block, or more formally:

sbx=bx
sby=by, by+2, by+4, by+6

The sbdiff1 for each of the vertically-oriented sub-blocks and the sbdiff2 values for each of the horizontally-oriented sub-blocks are compared to a threshold to determine if per-pixel correction should be enabled for that particular block. If any of the sbdiff1 or sbdiff2 values exceed the threshold, then a flag rf_motion(bx,by) is set for that block indicating the presence of significant repeat field motion.

As would be appreciated, the specific number of vertically-oriented and horizontally-oriented sub-blocks chosen can be implementation dependent. Also, the same number of sub-blocks need not be used. If that is the case, different thresholds may be used in the analysis vertical and horizontal analysis.

In one embodiment, a histogram of values of sbdiff1 and sbdiff2 are created. For example, a histogram for sbdiff1 can be created that has 64 bins, each with different thresholds. The rf_motion(bx, by) could then be set based upon the largest inhabited bin, or some linear combination of the bin values. Likewise, the histogram could also be used for sbdiff2.

Figure 3:
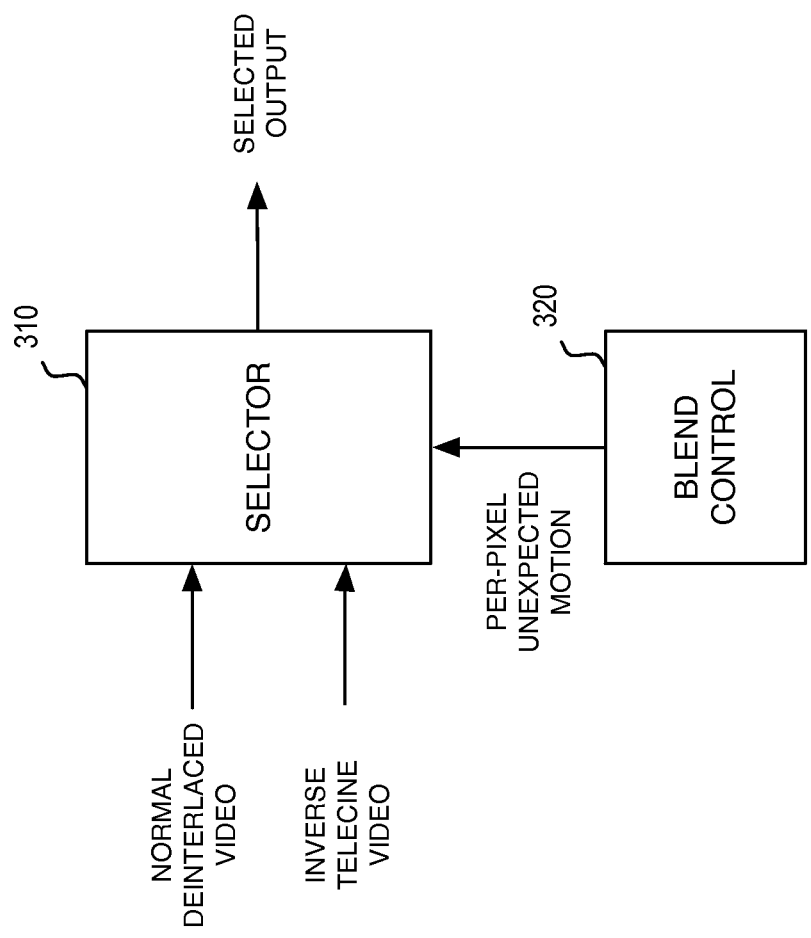
FIG. 3 illustrates an embodiment of a processing block in a motion-adaptive deinterlacer (MAD) that weaves fields together.

FIG. 3 illustrates an embodiment of a processing block in a motion-adaptive deinterlacer (MAD) that weaves fields together. As each output frame is being generated by the MAD, this processing block is generally designed to switch between using either the normal deinterlaced video or inverse telecine video based on the flags generated during detection. In areas where a flag indicates that video-mode content has been detected, the normal deinterlaced video is selected by selector 310. Otherwise, the inverse telecine video is used for that block of pixels.

The control of the switching by selector 310 is based on the input received from blend control module 320. In general, blend control module 320 can be designed to forward an indication of repeat field motion that is determined using functions such as sbdiff1 and sbdifj2. In one embodiment, the "Per pixel Unexpected Motion" value is set to be a maximum value when a 16×8 block is flagged as containing significant repeat field motion, and is set to a minimum value when the 16×8 block is not flagged.

In one embodiment, a set of flags is stored for each of the possible phases for a particular telecine cadence. In the example of a 3:2 pulldown illustrated in FIG. 1, five phases are present. A set of flags can therefore be stored for each of the five possible 3:2 pulldown phases. In this embodiment, since the flags are only updated on the repeat field, the effect of the flags is the same for five output frames (provided the MAD stays locked to the same phase in the 3:2 pattern). The flags are then reset and regenerated every time a repeat field is encountered in order to track moving video. If the MAD otherwise detects a lock loss, the flags can be reset.

In one embodiment, one or more previous sets of flags are stored for each phase. In this embodiment, the current flag and the previous sets of flags are OR'd together for a block to determine whether or not to use the normal deinterlaced video. In this manner, the identification of significant repeat field motion in a block would impact other blocks that are temporally proximate to that block. It should be noted that if a scene change is detected, the one or more previous sets of flags can be deemed to be invalid and therefore cleared.

In another embodiment, the identification of significant repeat field motion in a block would impact other blocks that are spatially proximate to that block. Here, the identification of significant repeat field motion in a block can lead to the use of normal deinterlaced video for one or more adjacent blocks. For example, all blocks diagonally, horizontally, and/or vertically adjacent to a flagged block could be corrected as well. In this manner, the likelihood that normal video is displayed using an inverse telecine process is reduced.

In general, the impact of a flagged block on other proximate blocks serves to create an expanded more uniform correction zone. Also, as the correction zone is enlarged/reduced based on the detection/non-detection of significant repeat field differences, the process of the present invention is adaptive to the per-pixel detection analysis.

Figure 4:
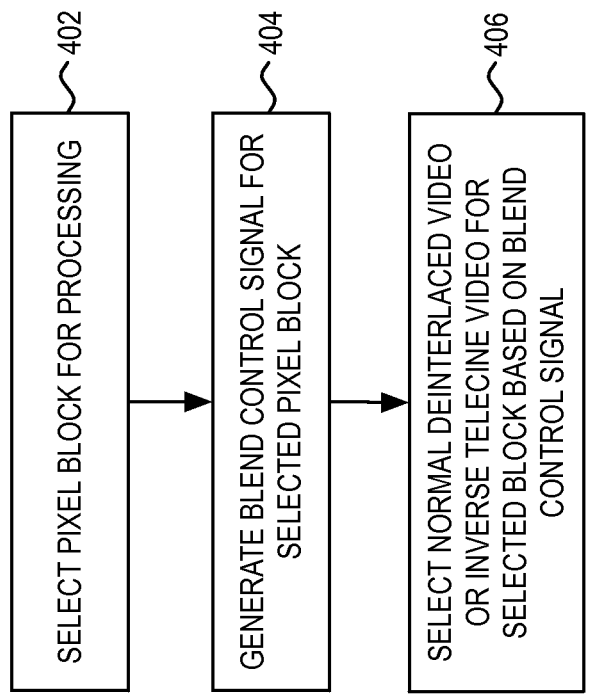
FIG. 4 illustrates a flowchart of a process of the present invention.

To further illustrate the features of the present invention, reference is now made to the flowchart of FIG. 4. As illustrated, the process begins at step 402 where a pixel block is selected for processing. In one embodiment, the screen is divided into a plurality of pixel blocks (e.g., 16×8 pixel block). Here, it should be noted that the plurality of pixel blocks can be distinct or overlapping. In general, using overlapped blocks provides another approach for consistency during detection.

For the selected block, a blend control signal is generated at step 404. In one embodiment, this blend control signal is based on whether or not the pixel block has been flagged as containing significant repeat field motion. In one embodiment, the significant repeat field motion is identified based on a difference measure analysis for a plurality of sub-blocks within the pixel block. As would be appreciated, the number and size of the sub-blocks would be implementation dependent. In one embodiment, vertical and horizontal rectangular sub-blocks are used to provide sensitivity to video moving in both the horizontal and vertical directions.

In another embodiment, the blend control signal can also be based on the existence of other flagged blocks that are proximate to the selected block. In various embodiments, these other flagged blocks can be temporally or spatially proximate to the selected block. An advantage of generating a blend control signal based on the existence of other flagged blocks that are proximate to the selected block is the creation of larger more uniform correction zones.

After the blend control signal is generated at step 404, the video output is selected at step 406 based on the blend control signal. Here, the blend control signal can be used by a selector module in determining whether normal deinterlaced video or inverse telecine video should be selected for output. If unexpected motion is signaled by the blend control signal for the selected block, then the normal deinterlaced video output is selected. Otherwise, the inverse telecine video output is selected.

As has been described, the block-based per-pixel correction process reduces undesirable artifacts because it differentiates the video areas of the screen from film areas of the screen. In this adaptive approach, only those blocks that have the potential of including such undesirable artifacts are corrected through the selection of normal deinterlaced video.

As would be appreciated, the principles of the present invention can be employed for doing per-pixel correction on other types of cadences that are found in test material (such as 3:2:3:2:2, 5:5, 6:4, 8:7, etc.). The present invention can also be useful for motion judder cancellation, which also needs to detect cadences and reliably detect whether a particular part of the screen is film or video.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method for displaying normal interlaced video along with inverse telecine video, comprising:
   performing by one or more circuits in a device, one or more functions including:
   identifying an established telecine cadence;
   determining a block-based difference measure of a first of a plurality of blocks of pixels in a pair of repeat fields in said identified establishes telecine cadence, wherein a video screen area is divided into said plurality of blocks of pixels;
   if said block-based difference measure does not indicate unexpected motion, then selecting an inverse telecine video output for said first of said plurality of blocks of pixels; and
   if said block-based difference measure does indicate unexpected motion, then selecting a normal deinterlaced video output for said first of said plurality of blocks of pixels and a second of said plurality of blocks of pixels that is proximate to said first of said plurality of blocks, of pixels.

2. The method of claim 1, wherein said second of said plurality of blocks of pixels is spatially adjacent to said first of said plurality of blocks of pixels.

3. The method of claim 1, wherein said second of said plurality of blocks of pixels is temporally adjacent to said first of said plurality of blocks, of pixels.

4. The method of claim 3, wherein said second of said plurality of blocks of pixels is in a previous frame or a next frame relative to a frame containing said first of said plurality of blocks of pixels.

5. The method of claim 1, wherein said second of said plurality of blocks of pixels is a plurality of frames into the future relative to a frame containing said first of said plurality of blocks of pixels.

6. The method of claim 1, wherein said block-based difference measure is based on pixel calculations in a plurality of vertically-oriented and horizontally-oriented sub-blocks of said first of said plurality of blocks of pixels.

7. The method of claim 1, wherein said first of said plurality of blocks of pixels is a 16×8 block that can be divided in to four equal sub-blocks.

8. The method of claim 1, wherein said block-based difference measure uses luma values.

9. The method of claim 1, wherein said block-based difference measure uses luma and chroma values.

10. The method of claim 1, wherein said inverse telecine video is a reverse 3:2 weave.

11. The method of claim 1, wherein said block-based difference measure is a sum of a plurality of difference calculations for a corresponding plurality of pixels in said first of said plurality of blocks of pixels to produce said block-based difference measure.

12. A method, comprising:
    performing by one or more circuits in a device, one or more functions including:
    selecting a first of a plurality of blocks of pixels in a frame, wherein a video screen area is divided into said plurality of blocks of pixels;
    determining a block-based difference measure of said first of said plurality of blocks of pixels in a pair of repeat fields in an established telecine cadence by summing a plurality of difference calculations for a corresponding plurality of pixels in said first of said plurality of blocks of pixels;
    selecting an inverse telecine video output for said first of said plurality of blocks of pixels when said block-based difference measure does not indicate unexpected motion; and
    selecting a normal deinterlaced video output for said first of said plurality of blocks of pixels and a second of said plurality of blocks pixels that is proximate to said first of said plurality of blocks of pixels when said block-based difference measure does indicate unexpected motion.

13. The method of claim 12, wherein said second of said plurality of blocks of pixels is spatially adjacent to said first of said plurality of blocks of pixels.

14. The method of claim 12, wherein said second of said plurality of blocks of pixels is temporally adjacent to said first of said plurality of blocks of pixels.

15. The method of claim 14, wherein said second of said plurality of blocks of pixels is in a previous frame or a next frame relative to a frame containing said first of said plurality of blocks of pixels.

16. The method of claim 12, wherein said second of said plurality of blocks, of pixels is a plurality of frames into the future relative to a frame containing said first of said plurality of blocks of pixels.

17. The method of claim 12, wherein said block-based difference measure is based on pixel calculations in a plurality of vertically-oriented and horizontally-oriented sub-blocks of said first of said plurality of blocks of pixels.

18. The method of claim 12, wherein said block-based difference measure uses luma values.

19. The method of claim 12, wherein said block-based difference measure uses luma and chroma values.

\* \* \* \* \*

UNITED STATES PATENT AND TRADEMARK OFFICE
CERTIFICATE OF CORRECTION

| | | |
|---|---|---|
| PATENT NO. | : 8,743,964 B2 | Page 1 of 1 |
| APPLICATION NO. | : 12/105664 | |
| DATED | : June 3, 2014 | |
| INVENTOR(S) | : Frederick G. Walls | |

It is certified that error appears in the above-identified patent and that said Letters Patent is hereby corrected as shown below:

In the Claims:

Col. 5, line 65, replace "establishes" with --established--.

Signed and Sealed this
Second Day of September, 2014

Michelle K. Lee
*Deputy Director of the United States Patent and Trademark Office*